United States Patent [19]
Hicks

[11] 3,897,144
[45] July 29, 1975

[54] MOVABLE OPTICAL SCANNING FOR N-S MOVEMENT IN A MAP DISPLAY NAVIGATIONAL APPARATUS

[75] Inventor: Terrence Albert Hicks, Stittsville, Canada

[73] Assignee: Control Data Canada, Ltd., Ottawa, Canada

[22] Filed: Apr. 8, 1974

[21] Appl. No.: 458,736

[30] Foreign Application Priority Data
June 15, 1973 Canada .................................. 174123

[52] U.S. Cl. ..................................... 353/11; 353/12
[51] Int. Cl.² ............ G03B 21/00; G03B 25/00; G03B 23/00
[58] Field of Search ................................ 353/11, 12

[56] References Cited
UNITED STATES PATENTS
2,505,793  5/1950  Rust et al. ............................... 353/11
3,208,336  9/1965  Vago ....................................... 353/12

OTHER PUBLICATIONS
Advanced Aircraft Instrumentation – Pictorial Navigation Displays, Hughes Aircraft Company, Culver City, Calif. 1960, p. 8, Pictorial Navigation Display Configuration IV.

Primary Examiner—Richard E. Aegerter
Assistant Examiner—Larry Jones
Attorney, Agent, or Firm—Richard J. Hicks

[57] ABSTRACT

A navigational apparatus, for use in a piloted craft in which a map is displayed pictorially on a screen, representative of the terrain over which the craft is passing. The apparatus employs a moving film strip, a light source and known means to focus and project the image onto a screen. The light source is adapted for translational movement across the width of the film synchronously with an optical scanning device placed between the film and the screen and also movable across the film, so that N-S scanning of an individual film frame may be effected. E-W scanning of the film frame is effected by advancing the film in the film transport.

7 Claims, 10 Drawing Figures

PATENTED JUL 29 1975

3,897,144

SHEET 1

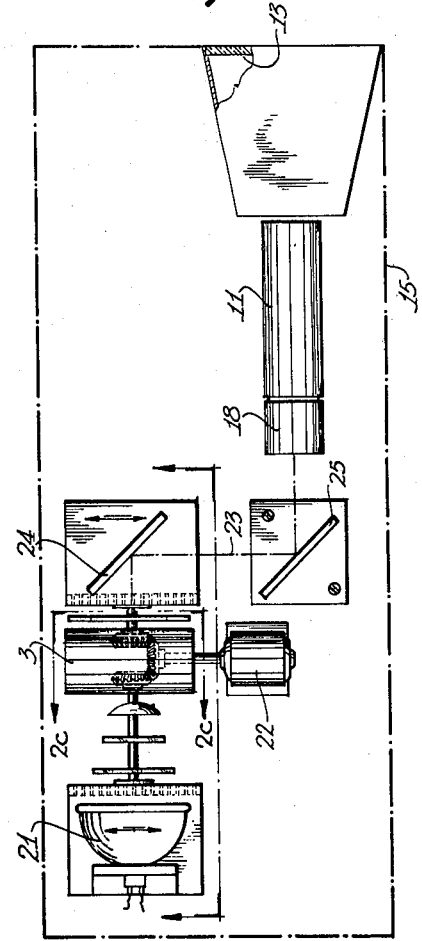
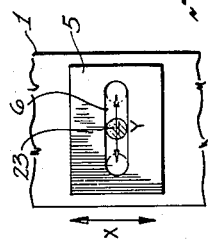
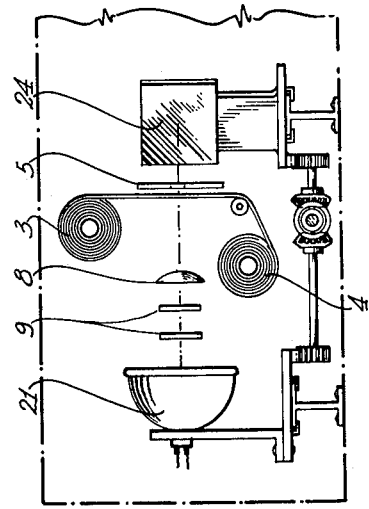

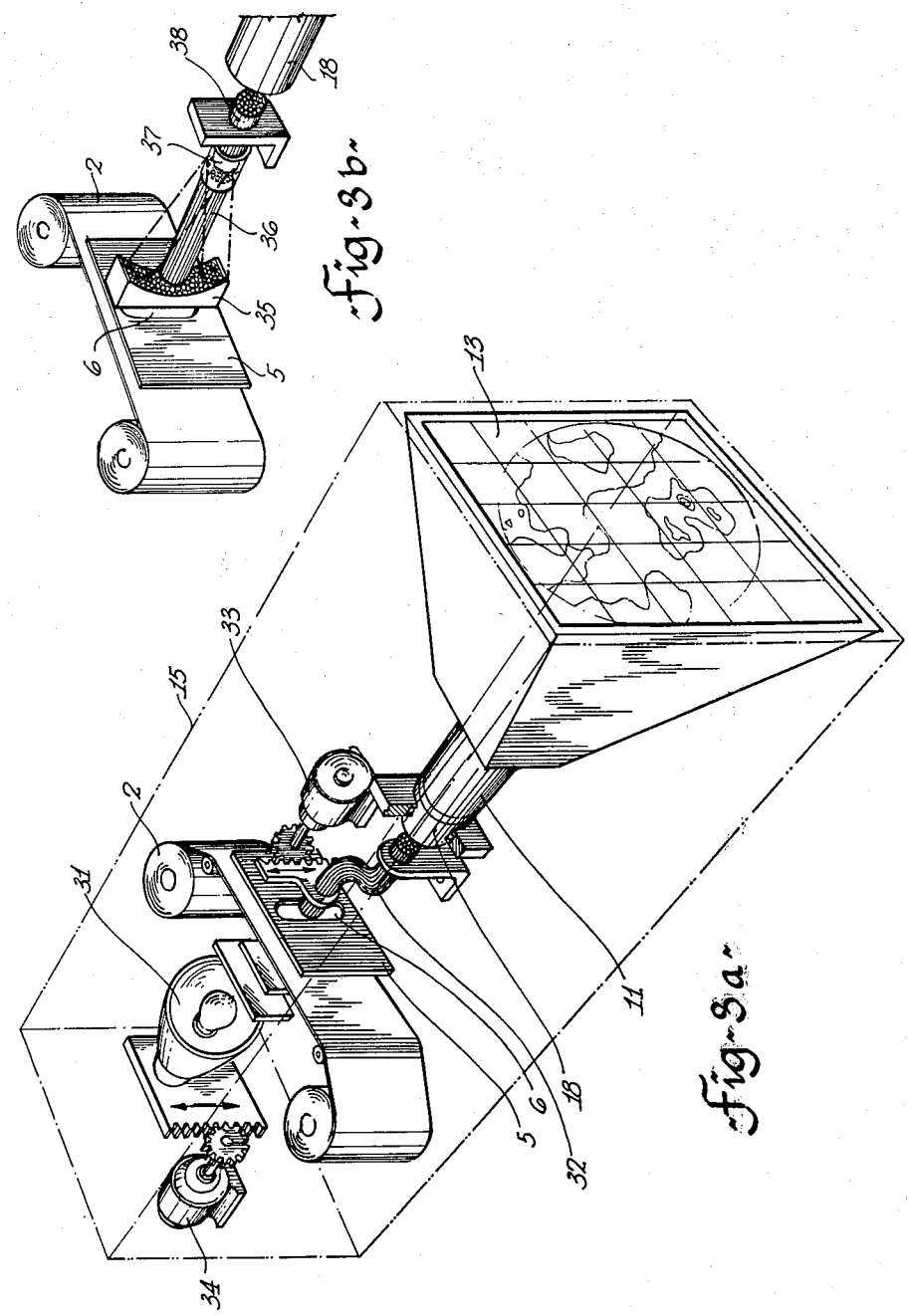

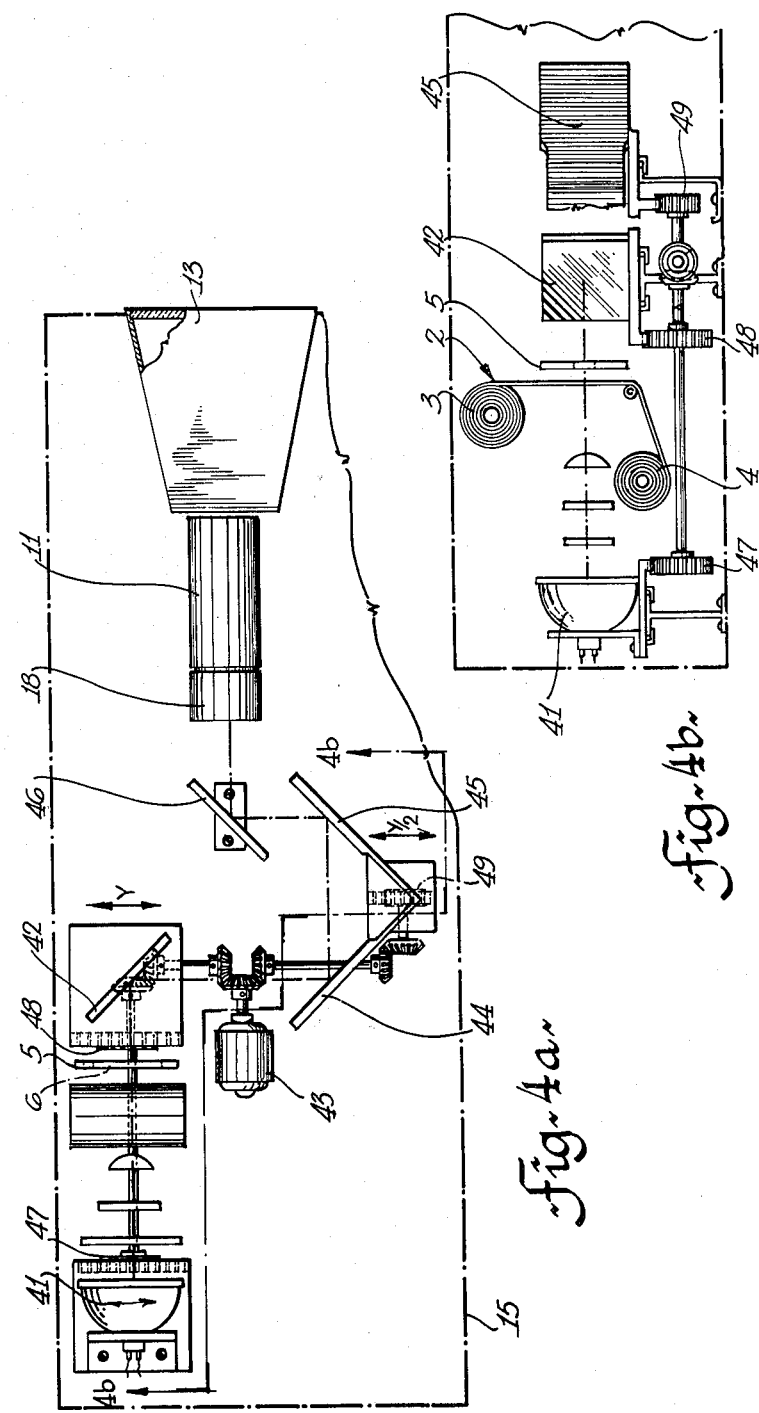

MOVABLE OPTICAL SCANNING FOR N-S MOVEMENT IN A MAP DISPLAY NAVIGATIONAL APPARATUS

This application relates to improved navigational apparatus, and in particular it relates to improved navigational apparatus having a pictorial map display.

The apparatus described herein is primarily intended for navigational use in aircraft, but it will, however, be understood that the apparatus is adaptable for use in any craft moving over a surface, or in any film reading apparatus examining portions of a film and hence requiring both X and Y coordinate movement.

Navigational apparatus which provides a form of pictorial representation of aircraft position is well known. In some instances the pictorial representation is projected onto the back surface of a special cathode ray tube also displaying other navigational information. In others the pictorial information is merely displayed upon a suitable screen. In either event the pictorial display is produced by projection of the image, usually magnified between about 10X and about 20X, of a portion of a film transparency representing a portion of a topographic map. Normally, a large number of transparencies or frames are combined in the form of a strip representing the whole map. Each frame usually represents a portion of Lambert conical map projection, overlapping by a predetermined amount at the ends and side the map portions represented by frames depicting adjacent map areas. The film, which in the past has conveniently, but not necessarily, been 35 mm film, is stored in a film transport or cassette system and transported back and forth between a pair of take-up spools as required to draw a desired frame into position adjacent a light passing aperture aligned with a light source on one side and the display screen on the other. A typical system is fully described in U.S. Pat. No. 3,208,336, issued Sept. 28, 1965, to R. E. Vago, and assigned to the assignee of the present application.

It will be appreciated that movement of the film between the spools adequately provides longitudinal motion of the film for selection of a desired frame or portion of a frame in that direction, by convention defined as the E-W or X direction, but it does not define transverse motion across the film for selection of a desired portion of a particular frame in that direction, by convention defined as the N-S or Y direction. N-S motion has, in the past, been provided by purely mechanical means, such as lateral movement of the entire film cassette assembly relative to the light passing aperture and light source, in order to obtain a desired portion of the frame in register with the light passing aperture, in the N-S direction and proper scanning across a selected frame in that direction.

In advanced navigational systems required for modern aircraft, increased accuracy and increased geographic coverage is often required in the map display system which cannot be provided by the conventional system. The problems are compounded by severe space and weight limitations particularly with the inclusion of a cathode ray tube for dynamic read-out of other required navigational information. It has been found that the required accuracy, increased image brightness and increased geographic coverage can best be achieved by using approximately 60 feet of 70 mm film instead of the more conventional 30 feet of 35 mm film. The problems of scanning a 70 mm width of film are, however, compounded, and furthermore the size of the cassettes required is considerably increased. The increased cassette size is not only more difficult to move accurately, requiring larger motors, but also the required rigidity of the system, due to the increased weight, is difficult to achieve under the anticipated environment for the system. The conventional mechanical means of obtaining N-S scanning of the film frames are, therefore, generally unsatisfactory.

It is an object of the present invention to provide an optical means of effecting N-S scanning of film material in a pictorial map display in a navigational apparatus.

It is a further object of the invention to provide an optical apparatus for effecting N-S scanning of a film frame which employs a fixed length optical path in order to avoid focal length compensation and chromatic aberration problems.

These and other objects will become more apparent from the following description taken in conjunction with the accompanying drawings in which:

FIG. 1b is a schematic top view of the map device of FIG. 1a;

FIG. 2a is a schematic top view of a simplified version of one embodiment of the device of the present invention;

FIG. 2b is a schematic side view of part of the embodiment shown in FIG. 2a;

FIG. 2c is a section along 2c—2c of FIG. 2a showing part of the film strip used in the device of FIG. 2a showing the X and Y scans;

FIG. 3a is an isometric view of an alternative embodiment of the present invention using flexible fibre optics;

FIG. 3b is a sketch of a variation of the embodiment shown in FIG. 3a;

FIG. 4a is a schematic top view of a preferred embodiment of the present invention showing optical path length compensation;

FIG. 4b is a schematic side view of part of the embodiments shown in FIG. 4a.

Figure 1A:
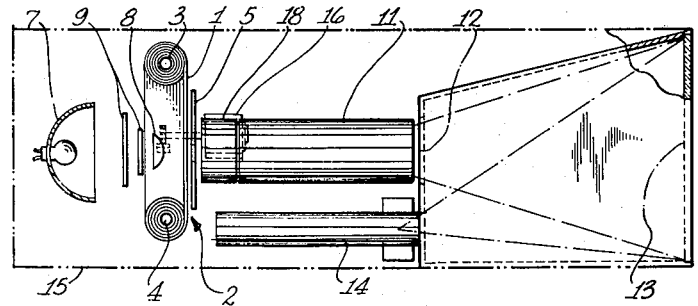
FIG. 1a is a schematic side view of map display device according to the prior art.
Figure 1B:
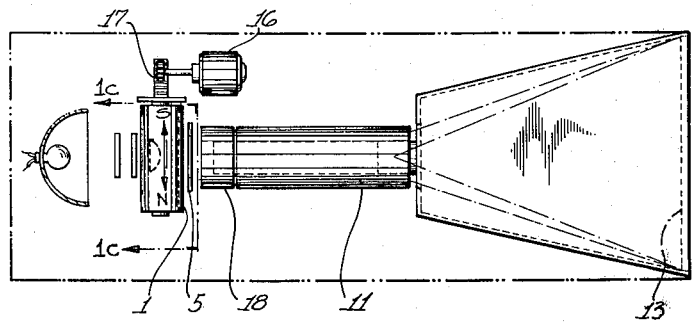
Figure 1C:
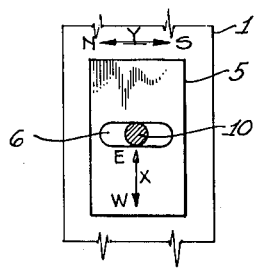
FIG. 1c is a section taken along 1c—1c in FIG. 1b showing the lateral sweep area of the cassette of the device of FIGS. 1a and 1b.

In FIGS. 1a, b and c there is shown a typical map display device of the prior art. A 35 mm film strip 1 comprising a plurality of frames representing portions of a large map, is contained in a film transport or cassette system 2, comprising take-spools 3 and 4 reversibly driven and controlled by motors (not shown) in known fashion. The film 1 is moved longitudinally between spools 3 and 4 over a plate 5, provided with a transverse light passing aperture or slit 6. A central portion of slit 6 is illuminated by means of a light projector or lamp 7, suitably provided with an optical focussing condenser system 8. Heat absorbing glasses 9 are usually provided to protect the film base of strip 1 from burning by lamp 7. Light, therefore, is projected through slit 6 and illuminates the portion 10 of film 1 in line therewith. The image is then projected through a projection lens system 11, known per se, and through a special window 12 to the rear face of a special cathode ray tube screen 13. Other navigational information is generated on the screen 13 from the cathode ray tube electron gun 14. For convenience, a known prismatic optical rotator 18, such as a Räntsch prism system, may be provided so that the map image projected onto the screen may be inverted or partially rotated to meet operational map orientation needs. The entire device is conveniently mounted on a frame or in box 15 in known manner. It will be appreciated that the E-W or X scanning of the film is achieved by advancing or retracting the film longitudinally between spools 3 and 4. N-S or Y scanning of the film is achieved by lateral displacement of the cassette system 2 by means of motor 16 on rack and pinion 17 relative to the apertured plate 6, as shown by the arrows in FIGS. 1b and 1c. As previously indicated, mechanical movement of the cassette system 2 is extremely cumbersome and difficult in the limited space available, when high accuracy and rigidity are required, with a cassette system for relatively large volumes of 70 mm film.

In view of the difficulty of translational movement of the enlarged cassette system required in advanced map display systems, it was determined that the N-S scan could be effected optically and FIGS. 2, 3 and 4 illustrate three alternative embodiments which have been developed to effect a translational optical scan in the N-S direction. E-W scanning is achieved, as before, by moving the film back and forth between the take-up spools.

In FIG. 2a there is shown a simplified system employing cassette and display units similar to those employed in FIG. 1. However, the light source 21, usually consisting of two lamps side-by-side to allow for quick changeover in case of lamp burn-out under operational conditions, is designed for lateral translational movement as shown by arrows by means of suitable gearing and motor 22. A focussed light beam 23 is therefore caused to track N-S across the film as shown in FIG. 2c. Beam 23 is directed to the lens projection system by means of a mirror 24 designed to scan synchronously with the movement of light source 21 by suitable geared connection to motor 22. Optionally, a second fixed mirror 25 may be mounted rigidly on frame 15 to reflect the light beam into the lens projection system 11. Alternatively, the lens system 11 may be so placed to receive light from mirror 24 directly. The system depicted in FIGS. 2a and 2b does, however, suffer a major disadvantage in that the length of optical light path between scanning mirror 24 and the lens projection system 11 constantly varies as the mirror 24 scans between its limits. As the focal depth of field for projection lens systems normally used is small, compensation for the back focal plane variation must be provided. This can be achieved by lens focal length adjustment, but this method is undesirable because of added lens complexity and cost.

The disadvantage of the variable length optical path may be overcome by the embodiment shown in FIG. 3, which shows a tracking light source 31 driven by motor 34 and similar to light source 21, a conventional cassette system 2 and film plane aperture 6. The translational scanning mirror 24 is, however, replaced by a flexible bundle of coherent fibre optic light pipes 32 which scans the aperture 6 in the direction of the arrows by means of suitable gearing and motor 33. The fibre optic light pipe has the advantages of being flexible and having an effectively zero optical path length. Packaging of the system into the frame or box 15 is optimized because of the flexibility which allows the film and illumination source to be in other than straight line relationship with the projection lens 11. For 70 mm film, however, it has been determined that to view a reasonable area of film at reasonable magnification, a light pipe up to about five-eighths inch is required. Presently commercially available fibre optics lose their flexibility in bundles over about one-quarter inch in diameter, so that use of a flexible fibre optic pipe is presently restricted to small size display units. The problem of flexibility may be overcome by dividing the optical fibre bundle into two portions as shown in FIG. 3b. A stationary portion of the bundle 35 spans the width of the film and acts as a distribution bar for the light passing through the film and an oscillating portion or bar 36 is adapted to scan across the distribution bar, thereby transmitting a portion of the light via a suitable joint 37 and collector 38 to the display screen 13 via projection lens 18. However, in order to ensure the very high optical resolution desirable in modern map display equipment, the diameter of the individual optic fibres should preferably be less than 0.0004 inch in diameter. Current technology limits available fibres to about 0.001 inch in diameter. It will be seen therefore that, while providing an "ideal" solution, technologically the fibre optic light pipe is not yet feasible for use in large size map display units. Its use is therefore presently limited to small scale low resolution units, but it is believed that technological improvements in the production of fine, flexible optic fibres will shortly make possible a large scale unit which overcomes the flexibility and resolution problems.

FIGS. 4a and 4b illustrate a preferred embodiment of the present invention which is based upon the use of translational movement of an optical scanning mirror system, as shown in FIG. 2, but which avoids the difficulties of path length variation experienced with the device described with reference to that Figure. As in the device described in FIGS. 2a and 2b, a tracking mirror is provided on one side of an apertured plate in the film plane. An angled scanning mirror 42 is provided to scan across the width of the film, as described with reference to FIG. 2, and synchronized with the movement of the light source 41 by a suitable motor 43. Light is reflected from mirror 42 onto mirror 44 mounted in a plane parallel thereto and thence to mirror 45, at right angles to mirror 44, and onwardly into a lens projection system 11. Optionally, and for space considerations, a further mirror 46 may be rigidly mounted on frame 15 to bend the light beam through 90° before entry to the lens projection system 11. As previously noted, light source 41 and mirror 42 are adapted to move across the width of the film, for convenience designated a distance Y, by means of identical gears 47 and 48 from motor 43. Mirrors 44 and 45, or the faces of a single prism, which serves the same function, are adapted to sychronously move a distance Y/2 by means of a gear 49, only half the circumference of gears 47 and 48, and mirror 46 is fixed. It will be appreciated that a single motor 43 may be suitably geared to drive the light source 41, mirror 42 and also mirrors 44 and 45. It will be further appreciated that the length of the optical path between mirror 42 and mirror 46 remains fixed, whatever the position of mirror 42 relative to fixed mirror 46. The problems of focal and attendant aberrations are thus avoided and, because the focal length of the mirror system is fixed and relatively short, the light loss is low so that the diameters of the lenses in the projection system can be relatively small, thereby saving weight and the all-important space. Direct N-S scanning of the film frame can be simply assured by means of a single drive motor 43, which can be suitably controlled by known techniques. The film image may be orientated, again by known tecnhiques, using an optical rotator 18, before the projection lens system 11.

I claim:

1. A navigational apparatus for use in a piloted craft, comprising:

a frame;

a light projector, including means for mounting said light projector for translational movement at one end of said frame, and a display screen mounted at the other end of said frame, having an optical light path therebetween;

a film transport means mounted on said frame, including means for moving a film back and forth longitudinally in a plane perpendicular to light from said projector and in said light path;

a light passing aperture fixedly mounted on said frame in said light path in a plane adjacent and parallel said plane of said film;

optical scanning means and means for mounting said scanning means on said frame in said light path;

means interconnected between said scanning means and said light projector for effecting synchronous translational movement thereof in a plane parallel with said movement of said light projector and transversely to said plane of said film to thereby scan across said film; and focussing means between said scanning means and said display screen to focus a film image on said screen.

2. A navigational apparatus as claimed in claim 1 wherein said optical scanning means comprises at least one bundle of optical fibres.

3. A navigational apparatus as claimed in claim 2 wherein said scanning means comprises a bundle of flexible optical fibres.

4. A navigational apparatus as claimed in claim 1 wherein said scanning means comprises a first front surface mirror mounted for said translational movement in a plane at an angle of 45° to said plane of said film.

5. A navigational apparatus as claimed in claim 4 wherein said means interconnected between said scanning means and said light projector moves said first front surface mirror a distance Y corresponding to the width of said film to be scanned; and including second and third front surface mirrors rigidly mounted at right angles to each other and spaced from said first mirror; said second mirror being mounted in a plane parallel to and facing the plane of said first mirror; and said means interconnected between said scanning means and said light projector moves said second and third mirrors a distance Y/2 synchronously with said first mirror such that said light path, between said first mirror and said focussing means, is of constant length.

6. A navigational apparatus as claimed in claim 1, including optical means between said scanning means and said focussing means to rotate said film image.

7. A navigational apparatus as claimed in claim 1 wherein said light path between said film and said focussing means is a predetermined length independent of the relative position of said scanning means.

* * * * *